United States Patent Office 3,089,892
Patented May 14, 1963

3,089,892
MONO, DI AND CYCLICPHOSPHONATE ALKYL
ESTERS AND PROCESS THEREOF
Harold James Harwood, Cuyahoga Falls, Ohio, assignor to Monsanto Chemical Company, St. Louis, Mo., a corporation of Delaware
No Drawing. Filed Oct. 31, 1960, Ser. No. 65,960
6 Claims. (Cl. 260—461)

This invention relates to a process for preparing new phosphorus esters. More specifically this invention relates to the preparation of new phosphonate esters containing alkoxyalkyl groups.

It is an object of this invention to provide new phosphonate esters. It is another object of this invention to provide a method for making certain phosphonate esters.

In general, this invention relates to the preparation of new phosphonate esters having a structural formula selected from the group consisting of (A)
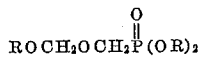

(B)
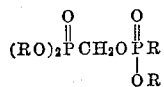

and (C)
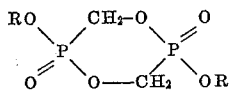

wherein R is an alkyl radical having from 1 to 12 carbon atoms. Compounds of type (A) may be named as dialkyl (alkoxymethoxy)methylphosphonates, an example of which is diethyl (ethoxymethoxy)methylphosphonate. Compounds of type (B) may be named as alkyl (dialkoxyphosphinyl)methyl alkylphosphonates, an example of which is hexyl (dihexyloxyphosphinyl)methyl hexylphosphonate. Compounds of type (C) may be named as 2,5-dialkoxy-1,4,2,5-dioxadiphosphorinane-2,5-dioxides, an example of which is 2,5-dipropoxy-1,4,2,5-dioxadiphosphorinane-2,5-dioxide.

The compounds of the types described above may be prepared according to the method of this invention by reacting a trialkyl phosphite having from 1 to 12 carbon atoms in each alkyl group with a concentrated formaldehyde source having at least 95% by weight of available formaldehyde, in the presence of a small amount of water. Hydrated polymers of formaldehyde such as a polyoxymethylene glycol having a formula

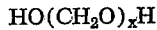

wherein $x$ is a number of from 4 to about 200 or mixtures of polyoxymethylene glycols of the above formula are preferred since they contain the small but significant amount of water necessary for the reaction. Paraformaldehyde, which is a mixture of polyoxymethylene glycols of the above formula, where $x$ is a number in the lower part of the range given and the greater proportion of which have a molecular weight exceeding that indicated by the formula,

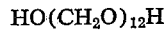

a formaldehyde content of about 95% by weight, and α-polyoxymethylene which is a higher molecular weight polymer having the same formula, but wherein $x$ has a value usually greater than 100, and contains about 99% by weight formaldehyde are examples of the type of polyoxymethylene glycols intended for use in this invention. Monomeric formaldehyde sources such as anhydrous gaseous formaldehyde monomer may be used if a small amount of water is present in the reaction mixture. However, commercial aqueous formaldehyde solutions containing 36–40% formaldehyde are not suitable for the purposes of this invention.

Trialkyl phosphites useful as starting materials for preparing the compounds of this invention are those having from 1 to 12 carbon atoms in the alkyl groups attached to the phosphorus atom. Examples of such compounds are: trimethyl, triethyl, triisopropyl, tri-n-propyl, tri-n-butyl, tri-tert-butyl, tri-tert-amyl, tri-n-hexyl, tri-n-heptyl, tris(2-ethylhexyl), tri-n-octyl, trinonyl, tridecyl, triundecyl, tri-tert-dodecyl phosphites, and the mixed phosphites such as amyl diethyl, butyl di-n-propyl, n-dodecyl dimethyl, and ethyl octyl propyl phosphites. Mixtures of phosphites may also be used.

Examples of dialkyl alkoxymethoxymethylphosphonate compounds (type (A)), of this invention are: dimethyl methoxymethoxymethylphosphonate, dipropyl propoxymethoxymethylphosphonate, dihexyl hexyloxymethoxymethylphosphonate, dioctyl octyloxymethoxymethylphosphonate, dinonyl nonyloxymethoxymethylphosphonate, didecyl decyloxymethoxymethylphosphonate, bis(2-ethylhexyl) (2-ethylhexyloxy)methoxymethylphosphonate, didodecyl dodecyloxymethoxymethylphosphonate, butyl propyl ethoxymethoxymethylphosphonate, and diamyl undecyloxymethoxymethylphosphonate.

Examples of alkyl (dialkoxyphosphinyl)methyl alkyl phosphonate compounds (type (B)) that may be prepared according to the method of this invention are, e.g., ethyl (diethoxyphosphinyl)methyl ethylphosphonate, butyl (dibutoxyphosphinyl)methyl butylphosphonate, heptyl (diheptyloxyphosphinyl)methyl heptylphosphonate, decyl (didecyloxyphosphinyl)methyl decylphosphonate, and dodecyl (didodecyloxyphosphinyl)methyl dodecylphosphonate.

Examples of 1,4-bis(alkoxyphosphinylidene)-2,5-dioxacyclohexane compounds (type (C)) that may be prepared according to this invention are: 2,5-diethoxy-1,4, 2,5-dioxadiphosphorinane-2,5-dioxide, 2,5-dibutoxy-1,4,2, 5-dioxadiphosphorinane-2,5-dioxide, 2,5-dioctyloxy-1,4,2, 5-dioxadiphosphorinane-2,5-dioxide and 2,5-didodecyloxy-1,4,2,5-dioxadiphosphorinane-2,5-dioxide.

The reaction between the trialkyl phosphite and the concentrated formaldehyde source as defined above may be carried out at decreased, ordinary, or increased temperatures under reduced, atmospheric, or increased pressures. However, normally it is desired to conduct the reaction at temperatures on the order of from 20 to 225° C., preferably from about 90 to 180° C. Temperatures below this range cause the reaction to proceed too slowly whereas temperatures much above the indicated upper limit tend to cause excessive decomposition of the reaction materials. The use of inert diluents is not necessary, when the trialkyl phosphite is a liquid. However, inert diluents or solvents may be used, and may be preferred where the reactants are solid. Such diluents may be, for example, benzene, toluene, dioxane, hexane, etc. Stoichiometric ratios of the reactants are generally sufficient to effect formation of the desired products. Often times, however, increased yields of product may be obtained if one of the reactants, e.g., the polyoxymethylene compound, is used in excess. Also, the yield of product obtained is enhanced if the reactants are as pure as possible.

When the reaction mixture is liquid, only trace quantities of water need be present to catalyze the reaction. Water should be present in from trace quantities to from about 4 to 5% by weight of the mixture but larger amounts of water hinder the desired reaction. The small amounts of water normally associated with polyoxymethylene glycol materials, i.e., amounts ranging from about 0.1 to about 5% by weight, are adequate to promote the desired reaction.

In conducting the process of this invention the trialkyl phosphite may be added to the concentrated formaldehyde source, the concentrated formaldehyde reactant may be added to the trialkyl phosphite, or the reactants may be added simultaneously to the reaction vessel.

The compounds provided by this invention are stable materials which range from viscous liquids to waxy or crystalline solids. Compounds of the types (A) and (B), described above, prepared by the process of this invention are particularly characterized by their ability to give off formaldehyde on hydrolysis, making them useful in insecticide, herbicide, and other agricultural applications. These esters also yield formaldehyde on heating which makes them useful as curing agents for certain polymers, for example, polythioureas. Those phosphonic acid esters of types (A), (B) and (C) are also valuable as plasticizers. Alkaline hydrolysis of such compounds produces products having surfactant and bacteriostatic properties.

The invention is further illustrated by the following specific examples.

*Example 1*

A mixture of α-polyoxymethylene (71 g.) and trimethyl phosphite (220 ml.) was stirred under nitrogen and heated at reflux (105–145° C.) for 48 hours. The almost clear solution which resulted was filtered and distilled. After discarding a small forerun, dimethyl methoxymethoxymethylphosphonate (62 g., 33.5% B.P. 113–6° C./3.5 mm., $n_D^{25}$ 1.4248–1.4258, was collected. Subsequent distillation yielded (dimethoxyphosphinyl)methyl methyl methylphosphonate (34 g., 13.9%) B.P. 150–153° C./0.7 mm., $n_D^{25}$ 1.4413.

In addition 4.0 g. of an oily solid, B.P. 190–4° C./1.5 mm. was collected. The solid was recrystallized several times from benzene to yield white needles, M.P. 151.5–152° C. which analyzed as follows for 2,5-dimethoxy-1,4,2,5-dioxadiphosphorinane-2,5-dioxide.

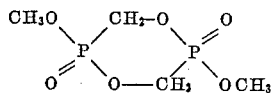

|  | Found | Anal.— Calc'd for $C_4H_{10}P_2O_6$ |
| --- | --- | --- |
| Percent C | 22.29 | 22.2 |
| Percent H | 4.98 | 4.63 |
| Percent P | 27.92 | 28.7 |

*Example 2*

A mixture of trimethyl phosphite (125 ml.) and paraformaldehyde (30 g.) was placed in a 300 ml. round-bottom flask and refluxed for 18 hours. The reflux temperature slowly rose from 110° C. to 140° C. during this time. The reaction mixture was then filtered from unreacted paraformaldehyde and distilled. After discarding a small forerun fraction, two fractions were collected: (a) 20.4 g., B.P. 106–110° C./4 mm., $n_D^{25}$ 1.4232–1.4255, and (b) 16.5 g., B.P. 155–160° C./1 mm., $n_D^{25}$ 1.4410–1.4420 which were combined and redistilled to yield two new compounds. The lower boiling product, $n_D^{25}$ 1.4650, 18.6 g. B.P. 130° C./12 mm., $n_D^{25}$ 1.4252 was shown by analysis and examination of hydrolysis products to be dimethyl methoxymethoxymethylphosphonate:

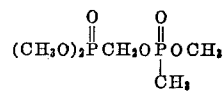

|  | Found | Anal.— Calc'd for $C_5H_{13}PO_5$ |
| --- | --- | --- |
| Percent C | 32.07 | 32.62 |
| Percent H | 7.09 | 7.12 |
| Percent P | 16.82 | 16.83 |
| Sap. Eq | 182.6 | 184.1 |
| Mol. Wt | 187 (camphor) |  |

Moles of CH₂O liberated on hydrolysis 0.95.

The higher boiling compound 15.1 g., B.P. 145.0–145.5° C./0.6 mm., $n_D^{25}$ 1.4440 analyzed as follows:

|  | Found | Anal.— Calc'd for $C_5H_{14}P_2O_6$ |
| --- | --- | --- |
| Percent C | 25.80 | 25.87 |
| Percent H | 6.40 | 6.40 |
| Percent P | 25.30 | 26.69 |
| Mol. Wt | 232 | 236 (Rast) |

Nuclear magnetic resonance indicates that the two phosphorus atoms in the molecule of this compound give dissimilar reading at −36 p.p.m. and −22.6 p.p.m. using H₃PO₄ as a reference, indicating that the phosphorus atoms are not identical in the substance. Proton magnetic resonance indicated the presence of a CH₃—P linkage; the compound is therefore assumed to be (dimethoxyphosphinyl)methyl methyl methylphosphonate:

$$\text{(CH}_3\text{O)}_2\overset{\overset{\text{O}}{\|}}{\text{P}}\text{CH}_2\text{O}\overset{\overset{\text{O}}{\|}}{\underset{\underset{\text{CH}_3}{|}}{\text{P}}}\text{OCH}_3$$

The remaining reaction product, 61 g. of residue, may be worked up as in Example 1 to recover 2,5-dimethoxy-1,4,2,5-dioxadiphosphorinane-2,5-dioxide, leaving a water soluble resinous material.

*Example 3*

A mixture of freshly purified tributyl phosphite, 175 g., and paraformaldehyde, 30 g., was slowly heated under nitrogen to 185° C. during 5 hours. No exothermic reaction was noted although the paraformaldehyde dissolved during the first two hours of heating. The solution was heated at 185° C. for an additional 9 hours. It was then filtered and distilled. After removal of a small forerun, two products were collected: Product a, 46.3 g., B.P. 153–7° C./2.5 mm., $n_D^{25}$ 1.4310 was dibutyl butoxymethoxymethylphosphonate and was shown to be of high purity by vapor phase chromatography techniques. Product b, 12.5 g., B.P. 161–171° C./1.1 mm., $n_D^{25}$ 1.4309 was analyzed in a similar manner and found to be (dibutoxy phosphinyl)methyl butyl butylphosphonate.

I claim:

1. Compounds of the formula

wherein R is an alkyl radical having from 1 to 12 carbon atoms.

2. Dimethyl methoxymethoxymethylphosphonate having the structure

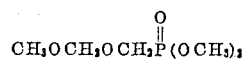

3. Dibutyl butoxymethoxymethylphosphonate having the structure

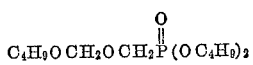

4. A process which comprises reacting a trialkyl phosphite having from 1 to 12 carbon atoms in each alkyl radical with a concentrated formaldehyde source having at least 95% by weight of available formaldehyde, said sources of formaldehyde being selected from the group consisting of polyoxymethylene glycols having a formula $$HO(CH_2O_4)_xH$$

wherein x is a number of from 4 to 200, and monomeric formaldehyde having at least 95% by weight of available formaldehyde, in the presence of water, the water being present in the amount of up to about 5% by weight of the reaction mixture and recovering from the resulting reaction mixture a compound having the formula selected from the group consisting of

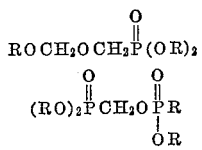

and

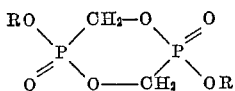

wherein R represents an alkyl radical having from 1 to 12 carbon atoms.

5. A process which comprises reacting trimethyl phosphite with a hydrated polymer of formaldehyde of the formula $HO(CH_2O)_xH$ wherein x is a number of from 4 to about 200, and recovering from the resulting reaction mixture a compound having a structure selected from the group consisting of

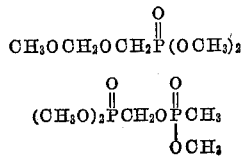

and

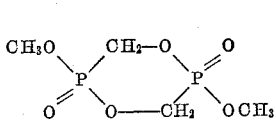

6. A process which comprises reacting tributyl phosphite with a hydrated polymer of formaldehyde of the formula $HO(CH_2O)_xH$ wherein x is a number of from 4 to about 200, and recovering from the resulting reaction mixture a compound having a structure selected from the group consisting of

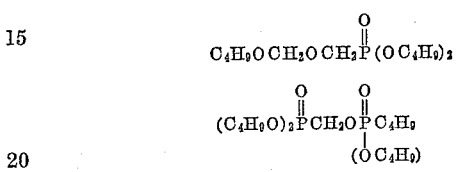

and

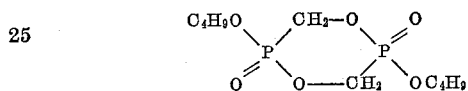

References Cited in the file of this patent
UNITED STATES PATENTS

| | | |
|---|---|---|
| 2,494,862 | Craig et al. | Jan. 17, 1950 |
| 2,653,161 | Ballard et al. | Sept. 22, 1953 |
| 2,765,331 | Whetstone et al. | Oct. 2, 1956 |
| 3,020,306 | Birum | Feb. 6, 1962 |

OTHER REFERENCES

Alimov et al.: "Bull. Acad. Sci. U.S.S.R. Div. Chem. Sci.," pages 761–767, 1955.

Arbuzov et al: "Zhur Obschei Chimie U.S.S.R.," vol. 29, pages 2617–2622, 1959.